United States Patent

[11] 3,552,528

| [72] | Inventor | Hermann Seip<br>Bad Vilbel, Germany |
|---|---|---|
| [21] | Appl. No. | 734,449 |
| [22] | Filed | June 4, 1968 |
| [45] | Patented | Jan. 5, 1971 |
| [73] | Assignee | Alfred Teves GmbH,<br>Frankfurt am Main, Germany,<br>a corporation of Germany |
| [32] | Priority | June 15, 1967 |
| [33] | | Germany |
| [31] | | No. T34104 |

[54] ADJUSTMENT DEVICE FOR A DRUM BRAKE
10 Claims, 4 Drawing Figs.

[52] U.S. Cl................................................. 188/79.5,
188/196
[51] Int. Cl................................................. F16d 65/56

[50] Field of Search.......................................... 188/79.5B,
66, GT, SC, SS, 196M

[56]  References Cited
UNITED STATES PATENTS

| 1,825,555 | 9/1931 | Stern | 188/79.5(GT) |
| 2,006,397 | 7/1935 | La Brie | 188/79.5(SC) |
| 2,508,105 | 5/1950 | Dodge | 188/79.5(GT)X |
| 2,570,398 | 10/1951 | Smith | 188/79.5(B) |

Primary Examiner—Duane A. Reger
Attorney—Karl F. Ross

ABSTRACT: An adjustment device for a drum brake comprises two coaxial portions, e.g. telescopically interconnected rods, one of which is variable as to length, and a restoring spring connecting the two portions and holding them in mutual abutment in a rest position of the brake while each rod is pivotally attached to one of the brakeshoes.

PATENTED JAN 5 1971

3,552,528

HERMANN SEIP
INVENTOR.

BY
Karl F. Ross
ATTORNEY

ADJUSTMENT DEVICE FOR A DRUM BRAKE

My present invention relates to an adjustment device for a drum-type brake having slidably supported brakeshoes carrying linings outwardly movable for engagement with an interior wall of a brakedrum.

Due to wear of their brake linings, internal expansion or drum-type brakes need periodic adjustment to maintain a certain rest position distance or brake play between the linings and the drum. With increased wear of the linings in such wheel brakes of a motor vehicle more brakeshoe travel is necessary. This travel is proportional to the driver-operated pedal travel such that a point may be reached where, before the shoes engage the drum, the pedal will strike the floorboard of the vehicle thereby inhibiting further braking. Before this point is reached, the brake play may increase to the extent that the brake fails to respond sufficiently rapidly to incipient depression of the pedal. Obviously this is dangerous since the operator of the vehicle can no longer brake completely or rely upon the previous braking effectiveness.

This periodic adjustment of drum brakes with slidably supported brakeshoes can be carried out conventionally in any of several ways according to the adjustment provisions of the specific wheel brake. In some models an eccentric screw of the brake shield engages in a slot in one shoe so that turning of this screw from outside the wheel brake moves the corresponding brakeshoe, which is inwardly biased by a restoring spring, in relation to the drum. In other cases an adjustment nut is provided between each brakeshoe and the cylinder associated therewith or between each brakeshoe and an abutment on the brake shield. As can be seen, one common feature of all these prior art devices is that two adjustments must be made for each wheel brake, one adjustment for each shoe.

It is an object of my invention to provide an improved adjustment device that allows simultaneous adjustment of both brakeshoes with a single operation.

This object is attained by an adjustment device comprising, in essence, a divided rod of variable length connecting the brakeshoes. A restoring spring holds the ends of two sections or portions of this rod in contact with each other in a brake rest position.

More particularly, my invention includes a bolt pivotally anchored by one end to one brakeshoe, an adjustment nut coaxial therewith threadedly receiving the free end of the bolt, and a rod also coaxial therewith pivotally anchored in the other shoe. The nut carries a sleeve coaxial therewith which defines a passage receiving the free end of the rod while abutments in the sleeve and on the rod serve as seats for a restoring spring. This spring can be a compression spring and holds the free end of the rod against the nut in a brake rest position.

In another embodiment two sections of the device fit telescopically into each other and are formed with abutments between which the restoring spring is received as in the above embodiment. One of these halves is divided and the two parts formed with opposing threads. An adjustment nut accepting these two ends may be rotated to force them further apart or closer together as desired.

Such a device permits adjusting both shoes with a single adjustment. Simply turning the single adjustment nut moves both brakeshoes inwardly or outwardly, as desired.

A feature of this invention is that the restoring spring, which does not extend from one shoe to the other, is not tensioned more or less according to the setting of the brakeshoes. Regardless of the brakeshoe setting it is only taxed in proportion to the brakeshoe displacement upon depression of the brake pedal. In most prior art devices this spring is tensioned to a greater extent when the shoes are at a wide, outward setting to compensate for worn brake linings than when the linings are new and set more inward.

A further feature is that the restoring spring and the adjustment device are well protected from the weather and, therefore, from corrosion. The restoring spring of my invention is encased in the adjustment device where the chances of it corroding are minimal. In addition the adjustment device itself lies entirely within the brake drum so that the adjustment screws have no projecting portions liable to corrosion and physical damage.

The above and other objects, features and advantages of my invention, which will become apparent hereinafter, are described below, reference being made to the accompanying drawing in which.

Figure 1:
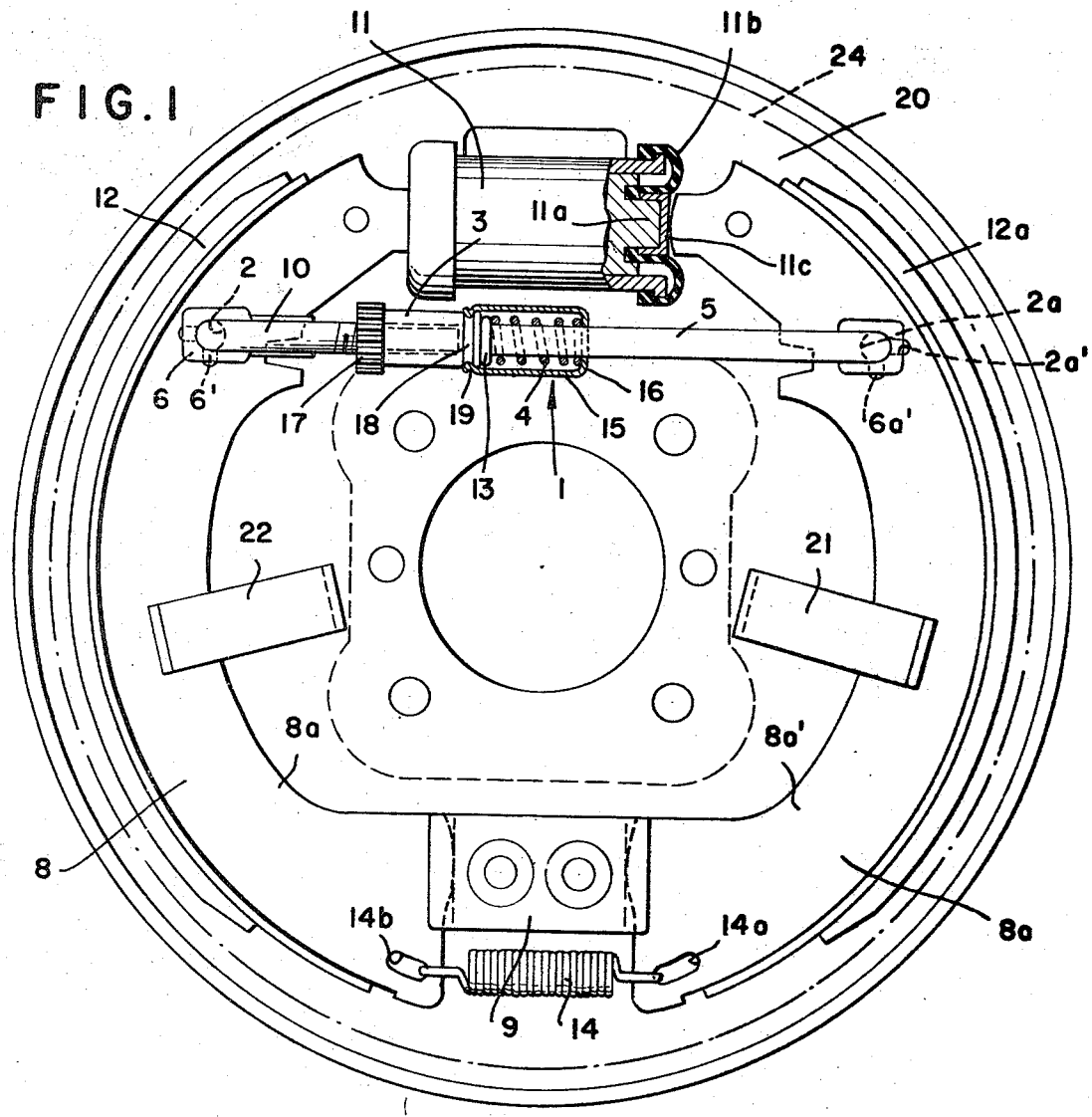
FIG. 1 is a side view, partly in section, of a drum brake equipped with a first embodiment of the adjustment device according to my invention.

FIG. 1 shows a simplex drum brake whose two cylindrical-arc segmental brakeshoes 8 and 8a are mounted on a brake shield 20 and held in place thereon by spring clips 21 and 22 engaging webs 8' and 8a' thereof. The lower ends of these shoes 8 and 8a are drawn inwardly, by a tension spring 14 hooked into holes 14a and 14b of the webs, to bear on a support or abutment 9 carried by the shield 20. At their upper ends the brakeshoes 8, 8a are displaceable outwardly by a wheel brake cylinder 11 receiving fluid from the master cylinder of the vehicle.

A brake lining 12a of the brakeshoe 8a is forced into engagement with an interior wall of a brakedrum represented as a dot-dash line 24 by its hydraulically actuated piston 11a protected by a dirt-excluding rubber sleeve or cuff 11b held in place thereon by a metal cap 11c. Axial motion of this piston 11a to the right in FIG. 1 pushes the shoe 8a into engagement with the brake drum 24. The shoe 8 is similarly actuated in the opposite direction by a piston (not shown) of cylinder 11 to force a brake lining 12 against the drum 24.

The upper ends of the brake linings 8 and 8a are connected by an adjustment and restoring device 1. An L-shaped bolt 10 of this device is pivotally anchored in a hole 2 in the web of shoe 8 and an L-shaped rod 5 coaxial therewith is similarly anchored in a hole 2a in the shoe 8a. An adjustment nut 3, in the form of a threaded sleeve, threadedly receives an end of the L-shaped bolt 10 and carries a sleevelike spring cage 15 in which the rod 5 formed at its free end with an annular ridge 13 is received. This sleeve 15 has on one end an annular clenching ridge 19 that snugly engages with an annular groove 18 on the adjustment nut 3 holding the two firmly together and terminates at its other end in an internal annular lip, rim or flange 16. A compression-type restoring spring 4 surrounds the rod 5 and is braced between the internal rim 16 of the sleeve 15 and on the annular ridge or shoulder 13 on the rod 5 to urge this rod 5 into contact with the nut 3. The nut 3 is provided with a ridged or toothed portion 17 that facilitates adjustment by being easy to grip or engage. This portion 17 can be rotated, for example, by a screwdriver inserted through a hole (not visible in FIG. 1) in the brake shield 20 behind it.

Figure 2:
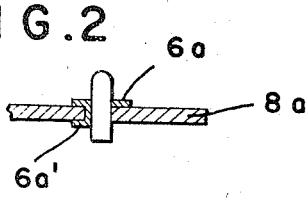
FIG. 2 is a section taken along the line 11–11 of FIG. 1.
Figure 3:
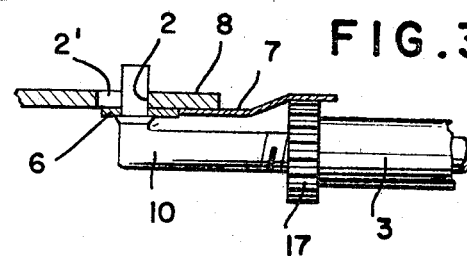
FIG. 3 is a section taken along the line III–111 of FIG. 2.

As also seen in FIGS. 2 and 3, the ends of the adjustment device 1 are held in place by speed nuts 6 and 6a with lugs 6' and 6a' that engage on the side of the brake shoes 8 and 8a respectively opposite the nuts 6 and 6a. These lugs 6 and 6a are inserted, as in a bayonet coupling, into the holes 2 and 2a so that the lugs 6' and 6a' pass through cutout portions 2' and 2a' respectively and then are turned through 90° to the positions shown in FIG. 1 to lock them. If not already done, the ends of the adjustment device 1 can simply be forced through the speed nuts 6 and 6a after this operation.

FIG. 3 further shows a locking spring 7 attached to the nut 6. This spring 7 engages in the ridged portion 17 of the adjustment device 1 preventing vibration from causing the adjustment nut 3 to turn and making the device 1 gradually go out of adjustment.

Figure 4:
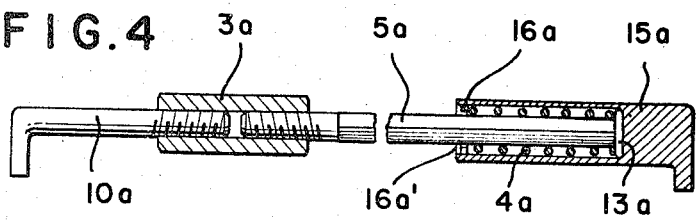
FIG. 4 is a longitudinal section through a second embodiment of the adjustment device according to my invention.

FIG. 4 shows a second embodiment of my adjustment device. In this embodiment a rod 5a with an annular ridge 13a is received through a square hole 16a in a square sleevelike member 15a with an internal rim 16a, a restoring spring 4a bearing against the ridge 13a and the rim 16a. The member 15a is mounted in a manner similar to the rod 5 of FIG. 1. The bolt 10a corresponds in function and mounting to the bolt 10 of FIG. 1. However, here a turnbuckle-type adjustment nut 3a receives a threaded end of the bolt 10a and an other threaded end of the rod 5a, the threads having opposing helical directions. In this manner, rotation of the nut 3a forces the two ends of the device apart or closer together depending on the direction of rotation. The square shapes of the rod 5a and the opening 16a' prevent the rod 5a from turning with the nut 3a during adjustment.

To adjust the wheel brake of a vehicle equipped with my device one need only turn the adjustment nut 3 or 3a until the proper clearance is set between the brake linings 12 and 12a and the brakedrum interior wall 24. The self-centering characteristic of drum brakes with slidably supported brakeshoes takes care of spacing each shoe at the same distance from the interior wall of the drum.

The improvement described and illustrated is believed to admit of many modifications within the ability of persons skilled in the art, all such modifications being considered within the spirit and scope of the invention except as limited by the appended claims.

I claim:

1. An adjustment device for a drum brake wherein two slidably supported brakeshoes are outwardly movable by actuation of at least one brake cylinder to engage an interior wall of a brake drum, said device comprising:
    a first elongated member connected by one of its ends to one of said shoes and having a first portion proximal to said one of said shoes and a second portion distal therefrom;
    screw thread adjustment means for varying the length of said first member by selectively displacing said second portion relative to said first portion while maintaining inelastic force transmission therebetween;
    a second elongated member connected by one of its ends to the other of said shoes; and
    a restoring spring connecting said members and biasing same longitudinally into mutual abutment in a rest position of the brake, said restoring spring engaging said second portion at a location spaced from the screw thread of said adjustment means.

2. An adjustment device as defined in claim 1 wherein said first member comprises a first rod, said second member comprises a second rod, and said restoring spring surrounds one of said rods.

3. An adjustment device as defined in claim 2 wherein said first rod has a first section formed with a threaded end and a second section coaxial therewith and formed with another threaded end, said threaded ends having opposing threads, said adjusting means comprising an adjustment nut receiving said ends.

4. An adjustment device for a drum brake wherein two slidably supported brakeshoes are outwardly movable by actuation of at least one brake cylinder to engage an interior wall of a brake drum, said device comprising:
    a first elongated member connected by one of its ends to one of said shoes;
    adjustment means for varying the length of said first member;
    a second elongated member connected by one of its ends to the other of said shoes; and
    a restoring spring connecting said members and biasing same longitudinally into mutual abutment in a rest position of the brake, said first member comprising a first rod, said second member comprising a second rod, said restoring spring surrounding one of said members, said rods being substantially coaxial and one of said rods being provided with a longitudinal passage telescopically receiving the other end of the other of said rods, said one of said rods being formed with a rim in said longitudinal passage, and said other of said rods being formed with an external ridge, said rim lying between said ridge and said one end of said other of said rods, and said restoring spring is a compression spring seated between said ridge and said rim.

5. The adjustment device defined in claim 4 wherein said first rod has a first section formed with a threaded end and a second section threadedly receiving said threaded end, said sections being relatively rotatable and forming said adjustment means.

6. The adjustment device defined in claim 5 wherein said second section is rotatable and is provided with an annular notched peripheral portion to facilitate rotation thereof.

7. The adjustment device defined in claim 2 wherein said rods are substantially coaxial and one of said rods is provided with a longitudinal passage telescopically receiving the other end of the other of said rods.

8. The adjustment device defined in claim 4 wherein said rods are substantially parallel to said wheel cylinder.

9. The adjustment device defined in claim 4 wherein said one of said rods carries a sleeve defining the longitudinal passage, said sleeve being formed with an internal lip comprising the rim.

10. The adjustment device defined in claim 4 wherein said brakeshoes are formed with holes, and said rods are each bent at said one ends, said bent ends being pivoted in said holes.